Patented Aug. 30, 1949

2,480,220

UNITED STATES PATENT OFFICE 2,480,220

HETEROCYCLIC POLYNUCLEAR KETO ALIPHATIC ACIDS AND THE PRODUCTION THEREOF

Robert R. Burtner, Skokie, and John M. Brown, Chicago, Ill., assignors to G. D. Searle & Co., Skokie, Ill., a corporation of Illinois No Drawing. Application September 5, 1947, Serial No. 772,456

17 Claims. (Cl. 260—335)

This invention relates to aliphatic keto acids and derivatives thereof substituted by polycyclic aromatic heterocyclic radicals, and to processes for the production thereof. In particular it relates to compounds having the general formula Ar-CO-R-COOX wherein Ar represents a polycyclic aromatic heterocyclic radical, R represents a bivalent aliphatic hydrocarbon radical, and X represents hydrogen, alkyl or aralkyl radicals, or cations derived from inorganic or organic bases.

The compounds which comprise this invention are useful as therapeutic agents. They are in general choleretic agents and as such affect the flow of bile. In the form of salts these acids are soluble in water and may be administered by a parenteral route. In the form of free acids or esters or salts they may be administered orally.

In the foregoing general formula the polycyclic aromatic heterocyclic radical represented by Ar is chosen from the radicals derived from polynuclear substances which are aromatic in character and which include xanthene, thioxanthene, phenoxthin and thianthrene. The bivalent radical, R, is an aliphatic radical derived from an aliphatic hydrocarbon, which may be saturated or unsaturated. The grouping R includes alkylene radicals of 1-8 carbon atoms such as methylene, ethylene, propylene, trimethylene, butylene, tetramethylene, hexamethylene and octamethylene, wherein the hydrocarbon chain may be straight or branched. It further includes radicals derived from unsaturated hydrocarbons such as those derived from olefins such as ethylene, propylene and butylene, and from acetylenes and related unsaturated aliphatic hydrocarbons. Among the derivatives of keto acids corresponding to the foregoing general formula, which are within the purview of this invention, are salts of alkali and alkaline earth metals, salts of aliphatic and araliphatic amines and esters of aliphatic and araliphatic alcohols such as the methyl, ethyl, propyl, benzyl and related alcohols. Alkaline salts of these acids may be prepared by solution of the acid in an alkaline carbonate solution, such as sodium carbonate, followed by salting-out with a salt, as for example sodium chloride. Likewise such salts may be prepared by treatment of an alcoholic solution of the acid with an alcoholic solution of alkali. The salts are often insoluble in the alcohol and may be obtained as precipitates. In other cases another solvent such as ether or benzene may be added to throw down the salt. Salts of aliphatic amines may be obtained by treating a solution of the acid in an organic solvent with a solution of the amine in a similar solvent and precipitating the desired salt with another miscible solvent in which the salt is insoluble.

The keto acids to which this invention relates may be prepared by means of Friedel-Crafts reactions of dibasic acid anhydrides or dibasic acid halides with polycyclic aromatic heterocyclic substances of the type discussed hereinabove. These reactions are carried out in the presence of Friedel-Crafts-type catalysts such as anhydrous aluminum chloride, anhydrous ferric chloride, stannic chloride, boron trifluoride, zinc chloride, hydrogen fluoride and the like, in inert solvents or solvents of lower reactivity than the polycyclic aromatic heterocyclic compounds. Included among such solvents are nitrobenzene, carbon disulfide, tetrachloroethane, benzene, chlorobenzene and related substances. The reactions may also be carried out using the monoester monoacid halide of a dibasic acid in the presence of the catalysts set forth hereinbefore. By this modification it is possible in certain instances to obtain esters of the desired keto acids of the formula given hereinabove. The dibasic acids used are preferably saturated acids, but in certain instances unsaturated acids such as maleic anhydride are suitable. Among the dibasic acid anhydrides and halides which can be used in our processes are those derived from malonic, succinic, maleic, glutaric, glutaconic, adipic, pimelic, suberic and sebacic and alkylated derivatives of these acids, such as isosuccinic, methylsuccinic, ethylsuccinic, dimethylsuccinic, alpha-methyladipic and betamethyladipic acids. The unsaturated keto acids obtained from unsaturated acid anhydrides or halides may be converted to saturated keto acids by reduction according to conventional techniques. Conversely, the saturated keto acids may be converted to unsaturated keto acids by halogenation followed by dehydrohalogenation.

Our invention is further disclosed by means of the following examples, which are set forth for the purpose of illustration and which in no way are to be construed as limiting our invention in spirit or in scope. It will be apparent to those skilled in the art that innumerable conventional modifications in solvent, temperature, catalyst and reagents can be adopted without departure from the intent and purpose of this invention.

Example 1

67 grams of anhydrous aluminum chloride are added portionwise with stirring over a 15-minute period to a suspension of 45.5 g. of xanthene and 25 g. of succinic anhydride in 250 cubic centimeters of dry benzene at room temperature. During the addition the temperature rises to about 65° centigrade. The suspension is stirred for 20 minutes and then stirred and refluxed for one hour. The reaction mixture is poured onto 500 g. of ice containing 70 cc. of concentrated hydrochloric acid. The benzene is removed by steam distillation and the hot residue is filtered. The solid so obtained is washed with water and taken up in 1 liter of water containing 50 g. of sodium carbonate. The solution is heated to boiling, filtered hot with a filter aid, and the hot filtrate is acidified. The precipitated keto acid is collected on a filter, washed with hot water, and dried at 65° C. It is recrystallized from acetic acid with the aid of decolorizing charcoal. Gamma-(2-xanthene)-gamma-oxobutyric acid so obtained melts at 202° C. It has the formula

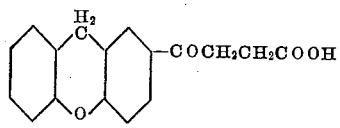

By a similar procedure using 32 g. of adipic anhydride instead of 25 g. of succinic anhydride, there is obtained epsilon-(2-xanthene)-epsilon-oxocaproic acid, which has the formula

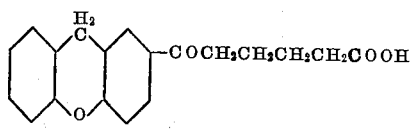

*Example 2*

To a solution of 49.5 g. of thioxanthene in 250 cc. of benzene are added 28 g. of succinic anhydride. The resulting suspension is stirred while 74.5 g. of anhydrous aluminum chloride are added portionwise during 30 minutes. The temperature rises to 50° C. during the addition. After the addition the mixture is stirred for 15 minutes, then heated to reflux for 1 hour. It is decomposed by pouring onto 625 g. of ice and 63 cc. of concentrated hydrochloric acid. The resulting mixture is steam distilled to remove solvent and the residue filtered. The yellow solid so obtained is taken up in 1 liter of boiling water containing 50 g. of sodium carbonate. The hot solution is treated with activated charcoal, filtered and added slowly to 275 cc. of 10% hydrochloric acid. The keto acid which precipitates is collected on a filter and dried at 65° C. After recrystallization from acetic acid gamma - (2 - thioxanthene) - gamma-oxobutyric acid melts at 188–190° C. It has the formula

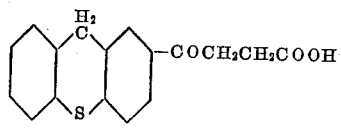

By a process similar to the foregoing, but using 36 g. of dimethylsuccinic anhydride in place of the 28 g. of succinic anhydride, there can be obtained alpha,beta-dimethyl-gamma - (2-thioxanthene) - gamma-oxobutyric acid, which has the formula

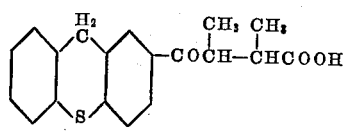

*Example 3*

To a solution of 200 g. of phenoxthin in 1 liter of dry benzene are added 110 g. of succinic anhydride. The suspension is stirred while 293 g. of anhydrous aluminum chloride are added during 30 minutes. The mixture is refluxed for 1 hour and then decomposed by pouring onto 2.5 kg. of ice containing 250 cc. of concentrated hydrochloric acid. The keto acid is isolated and purified as in Example 2. There is obtained in this way a mixture of isomeric acids melting at 150–155° C. Recrystallization of this mixture from acetic acid gives the 2-isomer. On further recrystallization from acetic acid gamma-(2-phenoxthin)-gamma-oxobutyric acid melts at 191–192° C. It has the formula

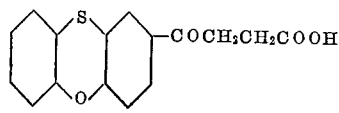

Concentration of the mother liquor from the first crystallization of the 2-isomer and drying under reduced pressure gives the 3-isomer. This on recrystallization from toluene and from 60% acetic acid gives pure gamma-(3-phenoxthin)-gamma-oxobutyric acid melting at 159–161° C. It has the formula

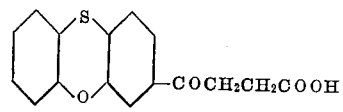

27 g. of crude gamma-(3-phenoxthin)-gamma-oxobutyric acid dissolved in 135 cc. of methanol containing 6.7 cc. of concentrated sulfuric acid are refluxed for 6 hours. The reaction mixture is evaporated to ½ its volume and poured into 600 cc. of 5% sodium carbonate solution. The methyl ester precipitates as a yellow sticky solid which is collected on a filter, triturated with water, and dried in vacuo. This material distils at 214–222° C. at 0.5 millimeter pressure and solidifies to a pale yellow solid which melts at 60–62° C.

*Example 4*

28 g. of thianthrene are dissolved in 125 cc. of dry benzene. 14 g. of succinic anhydride are suspended in this solution and 37 g. of anhydrous aluminum chloride are added in portions with stirring over a 15-minute period. The temperature rises during this time to 55–60° C. The reaction mixture is heated to reflux and stirred for 1 hour, then hydrolyzed by pouring onto 300 g. of ice containing 30 cc. of concentrated hydrochloric acid. After steam distillation to remove solvent the mixture is filtered. The filter cake so obtained is extracted with boiling 2% sodium hydroxide. The alkaline extract is filtered while hot, chilled and acidified with 10% hydrochloric acid. The precipitate which forms solidifies on standing and stirring and is collected on a filter and dried at 65° C. After recrystallization from acetic acid it melts at 167–169° C. The material so obtained is gamma-(2-thianthrene)-gamma-oxobutyric acid. It has the formula

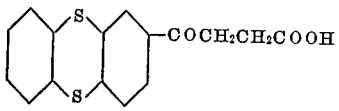

A similar method employing 26 g. of sebacic anhydride in place of 14 g. of succinic anhydride results in the formation of omega-(2-thianthrene)-omega-oxocapric acid, which has the formula

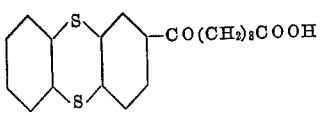

We claim:

1. A compound having the formula

Ar-CO-R-COOX wherein Ar is a radical derived from a polynuclear aromatic heterocyclic compound selected from the group consisting of xanthene, thioxanthene, phenoxthin and thianthrene, R is a bivalent aliphatic hydrocarbon radical, and X is a member of the group consisting of hydrogen, alkyl radicals and cations.

2. A compound having the formula

Ar-CO-R-COOX wherein Ar is a radical derived from a polynuclear aromatic heterocyclic compound selected from the group consisting of xanthene, thioxanthene, phenoxthin and thianthrene, R is an alkylene radical, and X is a member of the group consisting of hydrogen, alkyl radicals and cations.

3. A compound having the formula

Ar-CO-R-COOH wherein Ar is a radical derived from a polynuclear aromatic heterocyclic compound selected from the group consisting of xanthene, thioxanthene, phenoxthin and thianthrene, and R is an alkylene radical, and salts thereof.

4. A compound having the formula

Ar-CO-CH₂CH₂COOH wherein Ar is a radical derived from a polynuclear aromatic heterocyclic compound selected from the group consisting of xanthene, thioxanthene, phenoxthin and thianthrene, and salts thereof.

5. A compound having the formula

Ar-CO-R-COOH wherein Ar is a xanthenyl radical and R is an alkylene radical, and salts thereof.

6. Gamma-(2-xanthene)-gamma-oxobutyric acid and salts thereof.

7. The process for preparing a compound of the formula

Ar-CO-R-COOH wherein Ar is a radical derived from a polynuclear aromatic heterocyclic compound selected from the group consisting of xanthene, thioxanthene, phenoxthin and thianthrene, and R is a bivalent aliphatic hydrocarbon radical, which comprises reacting a polynuclear aromatic heterocyclic compound with a member of the group consisting of acid anhydrides and acid halides derived from dibasic acids of the formula

HOOC-R-COOH in the presence of a Friedel-Crafts catalyst in an inert solvent.

8. The process as in claim 7 wherein the polynuclear aromatic heterocyclic compound is xanthene.

9. The process as in claim 7 wherein the member of the group consisting of acid anhydrides and acid halides derived from dibasic acids of the formula HOOC-R-COOH, is succinic anhydride.

10. The process for preparing gamma-(2-xanthene)-gamma-oxobutyric acid which comprises reacting xanthene with succinic anhydride in the presence of anhydrous aluminum chloride in an inert solvent.

11. Gamma-(2-xanthene)-gamma-oxobutyric acid.

12. A compound of the formula

Ar-CO-R-COOH wherein Ar is a phenoxthin radical and R is an alkylene radical, and salts thereof.

13. A compound of the formula

Ar-CO-CH₂CH₂COOH wherein Ar is a phenoxthin radical, and salts thereof.

14. Gamma-(2-phenoxthin)-gamma-oxobutyric acid and salts thereof.

15. Gamma-(3-phenoxthin)-gamma-oxobutyric acid and salts thereof.

16. Gamma-(2-phenoxthin)-gamma-oxobutyric acid.

17. Gamma-(3-phenoxthin)-gamma-oxobutyric acid.

ROBERT R. BURTNER.
JOHN M. BROWN.

REFERENCES CITED

The following references are of record in the file of this patent:

UNITED STATES PATENTS

| Number | Name | Date |
|---|---|---|
| 2,339,789 | Lontz | Jan. 25, 1944 |